United States Patent
White

(10) Patent No.: US 8,417,804 B2
(45) Date of Patent: Apr. 9, 2013

(54) SYSTEM FOR PRESENTING MEDIA PROGRAMS

(75) Inventor: Scott White, Austin, TX (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 664 days.

(21) Appl. No.: 11/738,367

(22) Filed: Apr. 20, 2007

(65) Prior Publication Data

US 2008/0263618 A1    Oct. 23, 2008

(51) Int. Cl.
*G06F 15/177* (2006.01)
(52) U.S. Cl. ........ 709/221; 709/223; 709/229; 709/219; 709/231; 725/132; 725/80; 725/131; 725/133
(58) Field of Classification Search .................. 709/221, 709/223, 229, 219, 231; 725/59, 134, 142, 725/60, 131–133, 80
See application file for complete search history.

(56) References Cited

U.S. PATENT DOCUMENTS

| | | | | |
|---|---|---|---|---|
| 7,293,122 | B1* | 11/2007 | Schubert et al. | 710/62 |
| 2002/0035404 | A1* | 3/2002 | Ficco et al. | 700/65 |
| 2005/0246757 | A1* | 11/2005 | Relan et al. | 725/135 |
| 2007/0056013 | A1* | 3/2007 | Duncan | 725/134 |
| 2007/0077784 | A1* | 4/2007 | Kalayjian et al. | 439/61 |
| 2007/0245384 | A1* | 10/2007 | Walter et al. | 725/62 |
| 2007/0300264 | A1* | 12/2007 | Turner | 725/60 |
| 2008/0098450 | A1* | 4/2008 | Wu et al. | 725/132 |
| 2008/0120652 | A1* | 5/2008 | Guzman et al. | 725/59 |

* cited by examiner

*Primary Examiner* — Wing F Chan
*Assistant Examiner* — Benjamin M Thieu
(74) *Attorney, Agent, or Firm* — Guntin & Gust, PLC; Ed Guntin

(57) ABSTRACT

A system for presenting media programs is disclosed. A system that incorporates teachings of the present disclosure may include, for example, a multimedia system having a controller element to receive a request from a set-top box (STB) for an emulator that emulates a user interface of a media player, wherein the request identifies the media player, retrieve the emulator according to the identification of the media player, and transmit to the STB the emulator for emulating the user interface of the media player by way of the STB. Additional embodiments are disclosed.

21 Claims, 3 Drawing Sheets

SYSTEM FOR PRESENTING MEDIA PROGRAMS

FIELD OF THE DISCLOSURE

The present disclosure relates generally to media devices, and more specifically to a system for presenting media programs.

BACKGROUND

Multimedia systems can be configured or integrated with an interactive entertainment set-top box (STB). STBs generally require that customized devices of media programs (e.g., MP3 and/or MP4 players) either be copied to the hard drive of the STB or streamed thereto. This can be a time consuming and tedious process, particularly where a large number of smaller media files are involved, such as music files. Additionally, the user interface (UI) of the STB can be complicated, and unfamiliar to the user for playback of the transferred media programs, especially for a user who is accustomed to the UI of the media player that supplied the media programs to the STB.

A need therefore arises for a system for presenting media programs.

DETAILED DESCRIPTION

Embodiments in accordance with the present disclosure provide a system for presenting media programs.

In a first embodiment of the present disclosure, a multimedia system can have a controller element to receive a request from a set-top box (STB) for an emulator that emulates a user interface of a media player, wherein the request identifies the media player, retrieve the emulator according to the identification of the media player, and transmit to the STB the emulator for emulating the user interface of the media player by way of the STB.

In a second embodiment of the present disclosure, a computer-readable storage medium in a presentation device can have computer instructions for activating an emulator that emulates a user interface of a media player.

In a third embodiment of the present disclosure, a media player can have a controller element to receive operational instructions from an STB according to an emulator activated by the STB that emulates a user interface of the media player.

Figure 1:
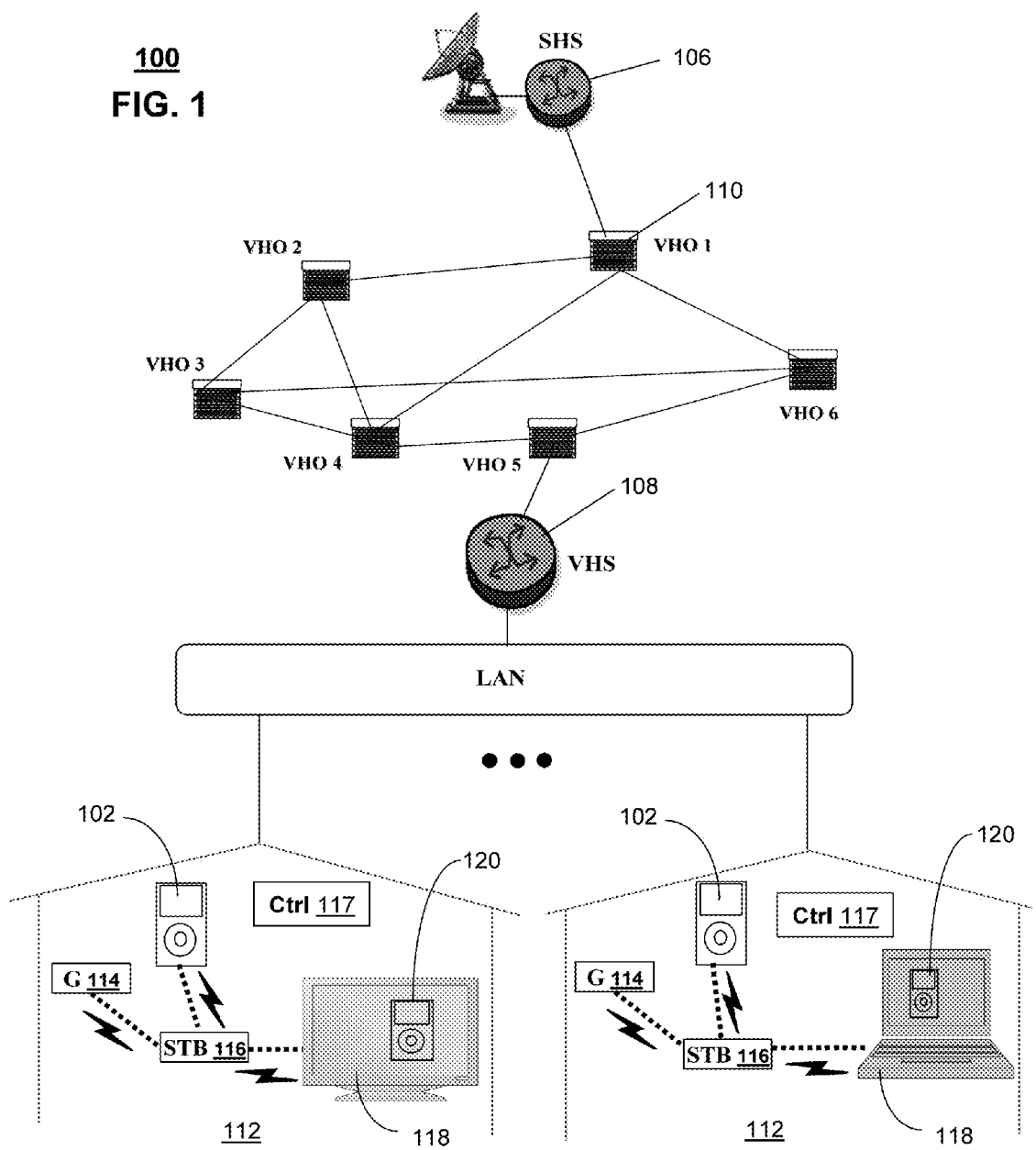
FIG. 1 depicts an exemplary embodiment of a communication system.

FIG. 1 depicts an exemplary embodiment of an internet protocol television (IPTV) communications system 100 having portions that can be configured for managing and presenting media stored on one or more media players (MPs) 102. In a typical IPTV backbone, there is at least one super head office server (SHS) 106 which receives national media from satellite and/or media servers from service providers of multimedia broadcast channels. The SHS 106 forwards IP packets associated with the media content to video head servers (VHS) 108 via a network of video head offices (VHO) 110 according to common multicast communication method. The VHS 108 then distributes multimedia broadcast programs to commercial and/or residential buildings 112 housing a gateway 114 (e.g., a residential gateway or RG). The gateway 114 can distribute broadcast signals to receivers such as Set-Top Boxes (STBs) 116 which in turn present broadcast selections to media devices 118 such as display systems (e.g., computers, LCD or CRT monitors, and LCD or CRT televisions) or audio systems managed in some instances by a wired or wireless media controller 117 (e.g., infrared or RF remote controls).

Unicast traffic can also be exchanged between the STBs 116 and the subsystems of the IPTV communication system 100 for services such as delivery of media to STBs 116. Although not shown, the aforementioned system 100 can also be combined with analog broadcast distributions systems.

An STB 116 operating in the system 100 can comprise a memory element, a controller element, a network interface, and a MP interface. The memory element can utilize common storage technologies (e.g., hard disk drives, flash memory, etc.) for retrieval and storage of various data including audio media, moving image media, and still image media, in one or more local or remote locations managed by the controller element. The controller element can utilize common audio, visual, and video processing technologies (e.g., Moving Pictures Experts Group (MPEG), Joint Photographics Experts Group (JPEG), Graphic Interchange Format (GIF), H.264, high definition TV, standard definition TV, etc.) to manage and present media on a media device 118. The network interface can utilize common networking technologies (e.g., LAN, WLAN, TCP/IP, etc.) to manage communication with the gateway 114 and the IP network via wireline (e.g., Ethernet or cable) or wireless communications (e.g., WiFi). The MP interface can utilize common wireline (e.g., USB or Firewire) and/or wireless (e.g., WiFi or Bluetooth) technologies to manage communications between the STB 116 and the MP 102.

Figure 2:
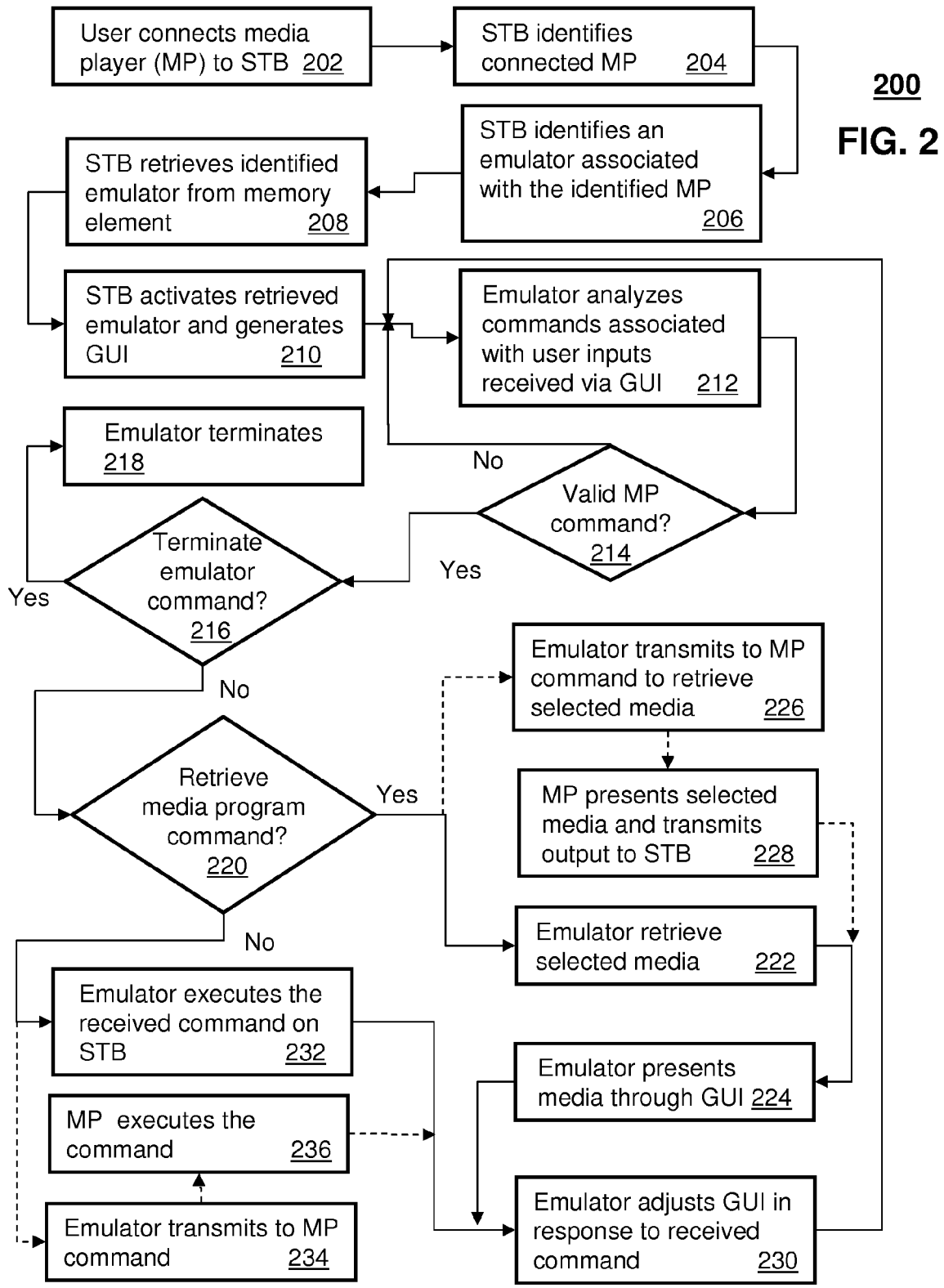
FIG. 2 depicts an exemplary method operating in the communication system.

FIG. 2 depicts an exemplary method 200 operating in portions of the communication system 100. Method 200 has variants as depicted by the dashed lines. It would be apparent to an artisan with ordinary skill in the art that other embodiments not depicted in FIG. 2 are possible without departing from the scope of the claims described below.

Method 200 begins with step 202 where the MP 102 is connected with the STB 116. The connection can be wireless or by wireline, and can be passive or active. For example, the user can connect a MP 102 to a USB port of the STB 116. In another example, the STB 116 can be configured to automatically detect and connect to MPs 102 having a wireless interface, such as Bluetooth or WiFi connection. In yet another example, the user can transmit a signal from one or both of the MP 102 and the STB 116 to establish a connection.

MPs 102 can include any type of device for the presentation of media that can be connected to a STB 116 via the MP interface, including personal or portable media devices. Media presented by MPs 102 can include audio media, visual media, and audio/visual media. For example, a MP 102 can be an audio-only device (e.g., MP3 music player or a satellite radio device), a video-only device (e.g., a digital camera), or an audio-visual device (e.g., a portable video and audio media player, a camera phone, or a digital video camera). Additionally, an MP 102 can be configured to store other files, including files associated with the media, such as playlists.

In response to the MP 102 being connected to the STB 116, the STB in step 204 can identify the connected MP. In some instances, the STB 116 can be configured to automatically identify the MP 102 on the basis of identifying information transmitted between the STB and the MP. Identifying information can include a model number, a serial number, or a description of the MP 102. For example, a MP 102 can be configured to automatically transmit identification information to the STB 116, such as an identifier string including model information. Alternatively or in combination, the STB 116 can be configured to allow a user to manually identify the MP 102. For example, after connection of the MP 102 to the STB 116, the STB can be configured to allow a user to identify the MP by prompting the user to select from a list of MPs. Additionally, such a manual entry configuration can be used when the STB 116 fails to automatically identify the MP 102. For example, a manual entry can be used by the user to identify a legacy MP 102 which may not be configured to provide an identifier string or a newer model of MP.

Once MP 102 is identified by STB 116, the STB can activate an emulator which emulates a user interface of the connected MP to allow users to manage and present media from the MP via the STB. Separately or in combination with step 204, the STB 116 in step 206 can be configured to identify an emulator that corresponds to the identified MP 102. For example, the STB 116 in step 206 can access a database listing emulators corresponding to various MPs 102. Additionally, a database containing MP 102 identification information can also include emulator identification information.

However, identification of a corresponding emulator can vary depending on the type of MP 102 and the configuration of emulators available to the STB 116. In some instances, one to one correspondence between emulators and MPs 102 can exist. That is, for each MP 102, a separate corresponding emulator can also exist. However, emulators can be configured to correspond with more than one MP 102 or even to an entire family of MPs. For example, a single emulator can be configured to correspond and operate with an entire line of MP products. In some instances, however, the STB 116 may not be able to identify an emulator corresponding to the identified MP 102. In such instances, the STB 116 can be configured to generate a corresponding error message for the user. Alternatively, or in combination, the STB 116 can be configured to automatically identify an alternate emulator. For example, the STB 116 can be configured to automatically identify an emulator for MP 102 from the same manufacturer, such as an emulator corresponding to a MP having a similar model number. In another example, the STB 116 can be configured to automatically identify a generic emulator associated with a particular MP 102. Such generic emulators can be configured to allow a user to control at least basic functions of the MP 102. For example, a generic MP3 player emulator can be configured to include at least a basic set of controls (e.g., play, stop, skip forward, skip back, volume control, etc.) common to all MP3 players.

Subsequently, or in combination with steps 204 and 206, the STB 116 in step 208 can be configured to automatically retrieve the identified emulator from a memory element. However, the location of the identified emulator can vary and can include locations in local memory elements of the STB 116 or in remote memory locations. These locations can be determined in several ways. For example, when the STB 116 accesses one or more databases to identify an emulator for the MP 102 in step 206, additional entries in such databases can be configured to include the location of the emulator. In another example, all emulators can be stored in one or more designated memory elements, and the STB 116 can be configured to automatically access these memory elements to retrieve the emulator. In some instances, at least some emulators can be stored in a local memory element of the STB 116. For example, a local memory element can store emulators for more common MPs 102 or emulators for MPs that have been previously connected to the STB 116. In other instances, an emulator can be stored within a memory element in the MP 102.

Once the emulator has been retrieved from a memory element by the STB 116, the STB in step 210 can activate the retrieved emulator. Subsequently, the user can use the emulator to manage and present media within the MP 102 via the STB 116. However, an emulator can be configured to operate and interact with the MP 102 in various ways. In some cases, an emulator can be configured to provide a complete emulation of the MP 102 itself. That is, the emulator would perform on the STB 116 all the functions that the hardware and/or system software of the MP 102 would perform to manage and present the media on the MP 102. For example, the STB 116 can be configured to transfer the currently selected media from the MP 102 to the STB 116. Subsequently, the emulator would access and process the transferred media just as the MP 102 would, and output the media via the media device 118.

However, in other cases, the emulator can be configured as only an input and output interface for the MP 102. In such instances, the STB 116 can transmit user inputs received by the emulator directly to the MP 102. Subsequently, the response or output generated by the MP 102 can be transmitted back to the STB 116 and the emulator can output via the media device 118 connected to the STB. For example, the output of audio media from the MP 102 to the STB 116 can be configured as an audio stream received by the STB and the emulator can output the audio stream to an audio system connected to the STB.

To facilitate user interaction with the MP 102 via the STB 116, the emulator can be configured to include a graphical user interface (GUI) 120 (shown in FIG. 1) that emulates the user interface for the media player. The emulator GUI 120 can be presented on a display device of the media device 118 or a media controller 117. For example, the emulator can configure an emulator GUI 120 to duplicate the user interface of an MP3 player connected to the STB 116 on a display device connected to the STB 116. Such a configuration allows the user to operate the emulator via the emulator GUI 120, and can allow the user to view and select media stored on the MP 102 as if the user were operating the MP.

However, the emulator GUI 120 is not intended to be limited to only duplicating the user interface of the MP 102. For example, the emulator can rearrange the input and output interfaces in the emulator GUI 120 as needed, required or desired. In some instances, the emulator can rearrange the input and output interfaces of the emulator GUI 120 to provide a more practical or usable interface. For example, if a MP 102 is configured with user input and output interfaces located on different surfaces of the MP 102, the emulator GUI 120 can be rearranged to allow for a two dimensional presentation on a display device. Alternatively, an emulator can provide a rearranged emulator GUI 120 in order to provide a compact footprint on the media device display.

The emulator GUI 120 can also include additional user inputs. For example, the emulator GUI 120 can provide user inputs to allow users to select a compacted version of the emulator GUI. In another example, the emulator GUI 120 can include a user input for the user to select a different emulator. In yet another example, the emulator GUI 120 can include a user input for transferring one or more files from the MP 102 to the STB 116.

Once the emulator is activated, the STB 116 can begin to receive user inputs and the emulator in step 212 can analyze the commands associated with such user inputs. User inputs can be received from a media controller, a user interface of the STB 116 or the media device 118, the MP 102, or any combination thereof. In some instances, each button on a media controller 117, STB 116, media device 118, or the MP 102 can be associated with a specific command. In other instances, the user can navigate the emulator GUI 120 using a D-pad or arrow buttons on a media controller 117, and input commands by selecting inputs for the emulator GUI using the media controller 117.

After analyzing the command associated with user input, the emulator in step 214 can determine whether the command corresponds to a valid command for the current MP 102. That is, the emulator can be configured to determine whether the MP 102 would normally respond to such a user input. For example, if a user input to increase volume is received by the STB 116 and the volume is already at a maximum level, the emulator can determine that the command is invalid and take no action. Similarly, if a command to proceed to the next track in an album or playlist is detected and no subsequent tracks exist, the emulator can determine that the command is invalid and take no action. Therefore, if the emulator determines that the user input received by the STB 116 does not correspond to a valid command for the MP 102 in step 214, the emulator can continue to monitor for and analyze other user inputs received by the STB 116.

If on the other hand the emulator does determine in step 214 that a user input corresponds to a valid command for the MP 102, then the command can be processed and the corresponding action can executed by the emulator according to steps 216-234. For example, the emulator in step 216 can determine whether the command received by the emulator corresponds to a command to exit the emulator. Such a command can correspond with a user input activating a power button in the emulator GUI 120 or on the MP 102 itself. In some instances, the emulator can include an additional button in the emulator GUI 120 to terminate the emulator. Additionally, the STB 116 can be configured to automatically generate a termination command for the emulator whenever the STB 116 detects that the MP 102 has been disconnected from the STB. Once a command to terminate the emulator is detected, the emulator can terminate in step 218 and cease displaying the emulator GUI 120.

Separately, or in combination with step 216, the emulator can also process user inputs in step 220 and execute corresponding commands for other functions of the MP 102 in steps 222-236. However, how the emulator interprets such user inputs can depend on how the emulator, the emulator GUI 120 and/or the MP 102 are configured. For example, some MPs 102 can be configured to include an input interface with one or more analog input devices, such as wheels, sliders, levers, or knobs. In such instances, the emulator can be configured to accept alternate types of input to activate such analog input devices. For example, for a volume control knob, the emulator can be configured to accept an input from volume up and down buttons on a remote control. However, the emulator can be configured to allow the user to select the "knob" in the emulator GUI 120 and to allow the user to adjust the position of the "knob" using repeated depressions of a D-pad, an arrow key, or other buttons on the media controller 117. Additionally, in instances where analog input devices are configured with maximum or minimum positions, such as in a volume or tuning knob, the emulator can provide an emulator GUI 120 having multiple selectable positions for the analog input device corresponding to various positions available for the analog input device. In one embodiment, the emulator can be configured to allow a user to input MP 102 commands for the emulator via the MP 102 without having to provide an alternative means for providing user inputs for such analog input devices.

Once the emulator determines that the user input, corresponds to a valid command for the MP 102 and is not a command to exit the emulator, the emulator in step 220 can determine whether the user input corresponds to a command to present new media. If the emulator determines in step 220 that the user input corresponds to a command to present new media, the emulator in steps 222-228 can retrieve and present the media on the media device 118 connected to the STB 116.

However, the response of the emulator to a command to present new media can depend on how the emulator is configured to operate with the MP 102. For example, the emulator in step 222 can directly retrieve the new media from the MP 102. Subsequently, the emulator in step 224 can present the retrieved media through the GUI 120 on a media device 118 connected to the STB 116.

In another embodiment, the emulator can be configured as an input and output interface for the MP 102. In such instances, a command corresponding to selecting new media can be transmitted to the MP 102 in step 226. The MP 102 in step 228 can retrieve and present the selected media and transmit the output of the MP 102 back to the STB 116. The emulator in step 224 can then present the transmitted media to the user via the media device 118.

Subsequently, or in combination with steps 222-228, the emulator can adjust the current presentation of the emulator GUI 120 in step 230 to reflect the new media being presented. For example, an emulator GUI 120 for an MP3 player can display audio program information for the newly selected audio program, such as artist name, album, and title of the audio program. In another example, for an MP3 player emulator presenting audio media, information displayed in the emulator GUI 120, such as elapsed time or time remaining, can be automatically adjusted by the emulator or retrieved from the MP 102.

Alternatively, the emulator can determine in step 220 that the user input corresponds to a command unrelated to selecting new media. In such cases, the emulator can execute the command associated with the received user input in step 232 and if necessary, adjust the emulator GUI 120 in step 230 to reflect the executed command. However, where the command is actually executed varies according to the configuration of the emulator, the STB 116, and the MP 102. Therefore, in some instances the emulator in step 234 can transmit the command to the MP 102 and the command can be executed by the MP 102 in step 236. For example, a command to increase or decrease volume for audio media can depend on the delivery of the audio media to the media device 118. If the emulator is configured to process the audio media directly from the MP 102, as in steps 222 and 224, then a command to increase or decrease volume would be executed by the emulator only, as a volume change on the MP 102 would not affect the output. In contrast, where the MP 102 is configured to retrieve and transmit the audio media as an audio stream to the STB 116, as in step 228, a volume change on the MP 102 can affect the output, therefore the command can be executed by the MP 102. In either case, the emulator in step 230 can adjust the emulator GUI 120 to reflect the results of the command being executed. Afterwards, the emulator in steps 212 and 214 can continue to monitor for and analyze user inputs of the STB 116 and repeat steps 216-236 to process any subsequent commands for the MP 102.

Upon reviewing the foregoing embodiments, it would be evident to an artisan with ordinary skill in the art that the present disclosure can be modified, reduced, or enhanced without departing from the scope and spirit of the claims described below. For example, the system 100 can comprise a cable media system, a satellite media system, an IPTV system, or any combination thereof. Therefore, the aforementioned steps in whole or in part can operate in one or more portions of one or more of the aforementioned systems. For example, the steps for the STB 116 to select and execute the emulators from databases can be executed in one or more portions of the cable media system, while other steps can be executed in an IPTV system. In another embodiment, the STB 116 and the MP 102 can frequently exchange media data during an on-going media presentation in order to accelerate presentation of the media after a media has been paused by caching media at the STB. In still another example, an STB 116 can be configured to copy all media from the MP 102 to a memory of the STB 116, and the emulator can process the media without having the access the MP 102. In yet another embodiment the media controller 117, media device 118, STB 116, the MP 102, and remote databases can in whole or in part be integrated to perform the methods described herein.

These are but a few examples of modifications that can be applied to the present disclosure without departing from the scope of the claims. Accordingly, the reader is directed to the claims section for a fuller understanding of the breadth and scope of the present disclosure.

Figure 3:
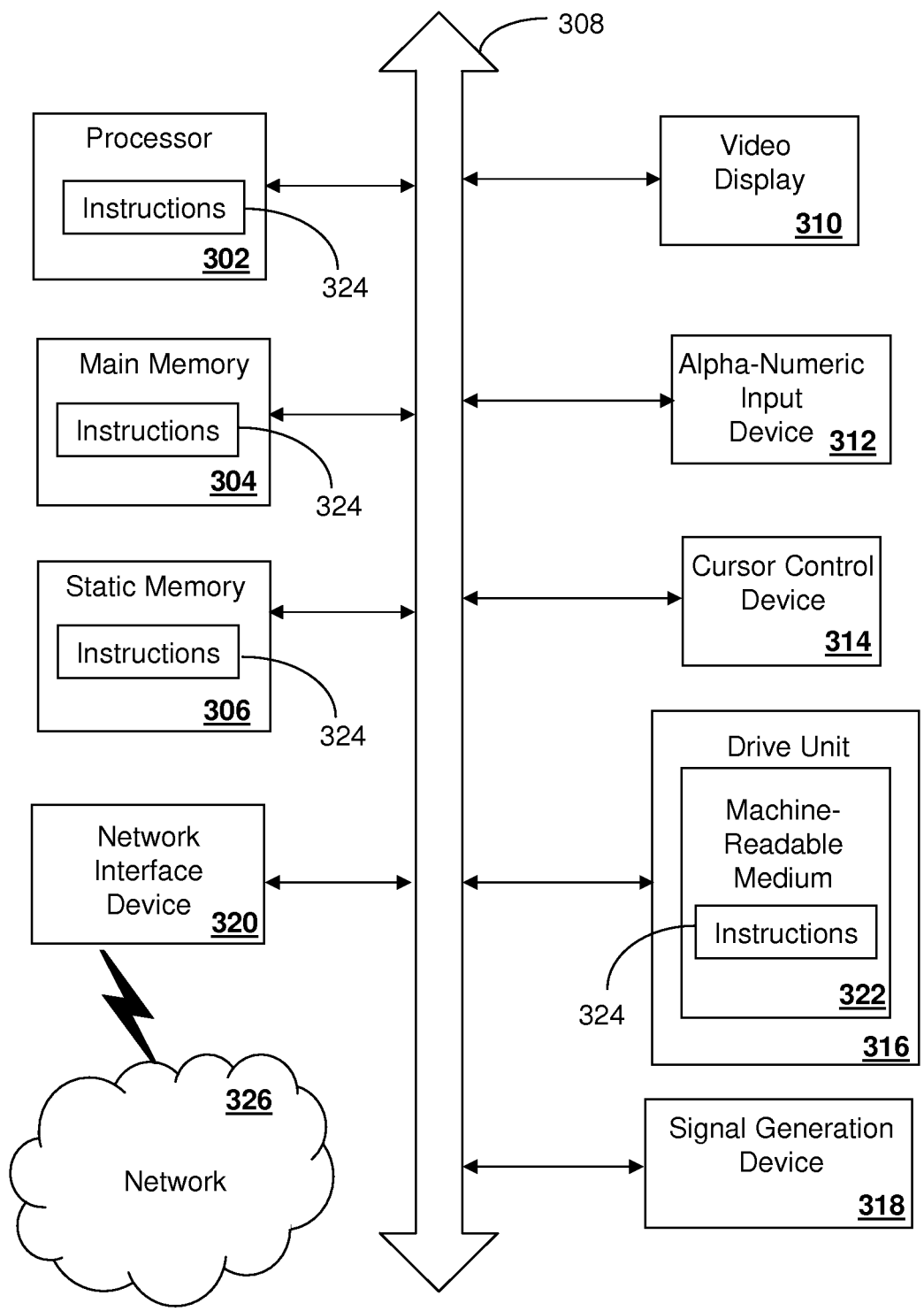
FIG. 3 depicts an exemplary diagrammatic representation of a machine in the form of a computer system within which a set of instructions, when executed, may cause the machine to perform any one or more of the methodologies disclosed herein.

FIG. 3 depicts an exemplary diagrammatic representation of a machine in the form of a computer system 300 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 300 may include a processor 302 (e.g., a central processing unit (CPU), a graphics processing unit (GPU, or both), a main memory 304 and a static memory 306, which communicate with each other via a bus 308. The computer system 300 may further include a video display unit 310 (e.g., a liquid crystal display (LCD), a flat panel, a solid state display, or a cathode ray tube (CRT)). The computer system 300 may include an input device 312 (e.g., a keyboard), a cursor control device 314 (e.g., a mouse), a disk drive unit 316, a signal generation device 318 (e.g., a speaker or remote control) and a network interface device 320.

The disk drive unit 316 may include a machine-readable medium 322 on which is stored one or more sets of instructions (e.g., software 324) embodying any one or more of the methodologies or functions described herein, including those methods illustrated above. The instructions 324 may also reside, completely or at least partially, within the main memory 304, the static memory 306, and/or within the processor 302 during execution thereof by the computer system 300. The main memory 304 and the processor 302 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 324, or that which receives and executes instructions 324 from a propagated signal so that a device connected to a network environment 326 can send or receive voice, video or data, and to communicate over the network 326 using the instructions 324. The instructions 324 may further be transmitted or received over a network 326 via the network interface device 320.

While the machine-readable medium 322 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived there from, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A multimedia system, comprising:
   a memory; and
   a controller element coupled to the memory, wherein the memory comprises computer instructions, which when executed by the controller element, cause the controller element to perform operations comprising:
   receiving a request from a set-top box for an emulator that emulates a media player by presenting the media player as a user interface in a graphical user interface, wherein the request identifies the media player, wherein the emulator comprises software instructions executed by the set-top box to emulate the user interface of the media player via the set-top box;
   retrieving the emulator according to the identification of the media player; and
   transmitting to the set-top box the emulator for executing the software instructions associated with the emulator, thereby emulating the user interface of the media player by way of the set-top box wherein the media player wirelessly communicates data for presentation without using a hardwire interface;
   wherein the user interface presented by the set-top box by way of the emulator substantially mimics the media player;
   wherein the media player presents at least one of audio media, moving image media, or still image media, and wherein the graphical user interface is presented on a display device of a remote controller or a presentation device coupled to the set-top box that manages operations of the set-top box.

2. The multimedia system of claim 1, wherein the audio media conforms to one of a plurality of standards defined by a Moving Picture Experts Group, wherein the moving image media conforms to one of plurality of standards defined by the Moving Picture Experts Group, and wherein the still image media conforms to one of a Joint Photographic Experts Group standard, or Graphic Interchange Format standard.

3. The multimedia system of claim 1, wherein the identification of the media player comprises one of a model number, a serial number, or a description of the media player.

4. The multimedia system of claim 1, wherein the multimedia system comprises one of an internet protocol television system, a cable media system, or a satellite media system.

5. A non-transitory computer-readable storage medium in a set-top box, comprising computer instructions that, when executed by one or more processors, cause the one or more processors to perform operations comprising:
   executing an emulator that emulates a media player by presenting the media player as a user interface in a graphical user interface, wherein the emulator comprises software executed by the set-top box to emulate the user interface of the media player via the set-top box; and
   receiving from the media player wirelessly data that is managed by the emulator;
   wherein the user interface presented by the set-top box by way of the emulator substantially mimics the media player;
   wherein the media player presents at least one of audio media, moving image media, or still image media, and wherein the graphical user interface is presented on a display device of a media controller or a presentation device coupled to the set-top box that manages operations of the set-top box.

6. The non-transitory computer-readable storage medium of claim 5, wherein the media player is coupled to the set-top box, and wherein the storage medium comprises computer instructions which, when executed by one or more processors, cause the one or more processors to perform operations comprising:
   presenting through the graphical user interface one or more media stored in the media player.

7. The non-transitory computer-readable storage medium of claim 6, comprising computer instructions which, when executed by one or more processors, cause the one or more processors to perform operations comprising:
   receiving by way of a selection applied to the graphical user interface a request to present the one or more media.

8. The non-transitory computer-readable storage medium of claim 7, comprising computer instructions which, when executed by one or more processors, cause the one or more processors to perform operations comprising:
   retrieving the one or more media wirelessly from the media player;

generating audio signals associated with the one or more media; and presenting said audio signals.

9. The non-transitory computer-readable storage medium of claim 7, comprising computer instructions which, when executed by one or more processors, cause the one or more processors to perform operations comprising:

receiving audio signals from the media player associated with the one or more media; and presenting said audio signals.

10. The non-transitory computer-readable storage medium of claim 7, wherein the one or more media selection is supplied to the set-top box by one of the media controller or the media player.

11. The non-transitory computer-readable storage medium of claim 7, wherein the one or more media comprises one of audio media, moving image media, or still image media, and wherein the presentation device comprises one of a display system, an audio system, or combination thereof.

12. The non-transitory computer-readable storage medium of claim 6, comprising computer instructions which, when executed by one or more processors, cause the one or more processors to perform operations comprising:

receiving by way of a selection applied to the graphical user interface a request to copy the one or more media from the media player;

retrieving said one or more media from the media player; and storing said one or more media.

13. The non-transitory computer-readable storage medium of claim 5, comprising computer instructions which, when executed by one or more processors, cause the one or more processors to perform operations comprising:

receiving by way of a selection applied to the graphical user interface a request to present a select media;

retrieving the selected media from memory; and presenting the selected media.

14. The non-transitory computer-readable storage medium of claim 5, comprising computer instructions which, when executed by one or more processors, cause the one or more processors to perform operations comprising:

determining an identification of the media player;

submitting to a multimedia system the identification of the media player;

receiving from the multimedia system the emulator selected according to the identification of the media player responsive to the identification of the media player being identifiable by the multimedia system; and generating an error message and configured an alternate emulator responsive to the identification of the media player being unidentifiable by the multimedia system.

15. The non-transitory computer-readable storage medium of claim 5, comprising computer instructions which, when executed by one or more processors, cause the one or more processors to perform operations comprising:

determining an identification of the media player;

retrieving the emulator according to the identification of the media player.

16. The non-transitory computer-readable storage medium of claim 5, comprising computer instructions for receiving the emulator from the media player.

17. A media player, comprising:

a memory; and a controller element coupled to the memory, wherein the memory comprises computer instructions, which when executed by the controller element, cause the controller element to perform operations comprising wirelessly receiving operational instructions from a set-top box according to an emulator executed by the set-top box that emulates a user interface of the media player by presenting the media player in a graphical user interface, wherein the emulator comprises software executed by the set-top box to emulate the user interface of the media player, and wherein the emulator is supplied to the set-top box by way of a multimedia system communicatively coupled to the set-top box;

wherein the user interface presented by the set-top box by way of the emulator substantially mimics the media player;

wherein the media player presents at least one of audio media, moving image media, or still image media, and wherein the graphical user interface is presented on a display device of a remote controller or a presentation device coupled to the set-top box that manages operations of the set-top box.

18. The media player of claim 17, wherein the audio media conforms to one of a plurality of standards defined by a Moving Picture Experts Group, wherein the moving image media conforms to one of a plurality of standards defined by the Moving Picture Experts Group, and wherein the still image media conforms to one of a Joint Photographic Experts Group standard, or Graphic Interchange Format standard.

19. The media player of claim 17, wherein the controller element further performs operations comprising supplying the emulator to the set-top box.

20. The media player of claim 17, wherein the controller element further performs operations comprising supplying the set-top box an identification of the media player for selecting the emulator, and wherein the identification of the media player comprises one of a model number, a serial number, or a description of the media player.

21. The media player of claim 17, wherein the controller element wirelessly provides media content to the set-top box.

* * * * *